US005441787A

United States Patent [19]

Fujii et al.

[11] Patent Number: 5,441,787

[45] Date of Patent: Aug. 15, 1995

[54] COMPOSITE WOOD PRODUCT AND METHOD FOR MANUFACTURING SAME

[75] Inventors: Tsuyoshi Fujii; Atsushi Miyatake, both of Inashiki, Japan

[73] Assignee: The Forestry and Forest Products Research Institute, Ibaragi, Japan

[21] Appl. No.: 195,750

[22] Filed: Feb. 14, 1994

[51] Int. Cl.$^6$ .................................................. B32B 5/12

[52] U.S. Cl. ........................................ 428/57; 144/358; 144/359; 428/105; 428/106; 428/113; 428/114; 428/172; 428/194; 428/537.1

[58] Field of Search .................. 428/57, 105, 106, 438, 428/172, 113, 114, 537.1, 194; 114/358, 359

[56] References Cited

U.S. PATENT DOCUMENTS 4,563,237 1/1986 Churchland et al. .............. 156/62.2
4,689,257 8/1987 Baum .................................. 428/106
4,706,799 11/1987 Churchland et al. ............... 198/457
4,872,544 10/1989 Churchland et al. ............... 198/382
4,968,549 11/1990 Smimizu .............................. 428/106
5,054,603 10/1991 Churchland et al. ............... 198/382

*Primary Examiner*—Nasser Ahmad
*Attorney, Agent, or Firm*—Barry R. Lipsitz

[57] ABSTRACT

A method and apparatus are provided for manufacturing a composite wood product from split and disrupted pieces of a raw material such as cedar, willow or bamboo. The composite may be employed as a thick plate of wood, pillar wood, beam wood and the like used for furniture, buildings, and structural objects. The composite is formed by roughly splitting and disrupting a fibrous raw material lengthwise. The roughly split and disrupted material is then finely split and disrupted, and then dried. A single layer is formed by laterally arranging and adhering the finely split and disrupted wood pieces. The single layers are then formed into a pile and heated and pressure tightened.

8 Claims, 13 Drawing Sheets

COMPOSITE WOOD PRODUCT AND METHOD FOR MANUFACTURING SAME

BACKGROUND OF THE INVENTION

The present invention relates to a composite wood product and a method and apparatus for manufacturing such a product. More particularly, a wood product is provided that is formed from layers of split and disrupted pieces of raw material such as small diameter tree branches and the like. The product is useful in making thick plates, pillar beams and the like for furniture, residential and commercial buildings and other structural objects.

In the past, ligneous group structural wood for use, e.g., for pillars and/or beams has generally included lumber, i.e., raw wood cut to a predetermined size and shape. The raw wood was normally formed of wood having a diameter of more than 100 mm yielding, from a standing tree main body, 50–60% and yielding, from a standing tree including branches as well, approximately 30–50% of the total tree material. Moreover, where the lumber includes defects such as gnarls, the strength of the lumber decreases remarkably relative to the strength inherent in wood without gnarls. In particular, the strength of the lumber having gnarls decreases 40–50% relative to that having no gnarls.

In a previously developed process, sometimes referred to as the "collected wood" process, raw wood was sawed into "plates" and adhered together in a pile to form a laminate. This was previously developed for solving the reduced strength problem caused by gnarls associated with lumber. This process improves the strength of the lumber by 60 to 75% compared to that having gnarls. However, a problem arises with this method in that the wooden parts are consumed by a cutting process for forming plate materials, whereby the yield from the standing tree is decreased to approximately 30–40% of the total tree material.

In another method involving single plate piled wood (LVL), wood is piled and adhered with a single plate (veneer). This process improves the yield from a standing tree to 60–70%. Since sawing is not required as with the normal lumbering process for forming the single plate, sawdust is not produced as in the lumbering and collected wood processes. Also, the strength achieved is similar to that obtained using the collected wood process. However, since the single plate is manufactured by rotating raw wood and peeling thin pieces off using a cutter, the matter which can be utilized is limited to raw wood of a relatively large diameter.

As is well known, wood and bamboo have many advantages including a desired look and feel, plentiful supply and easy processing, and quick reproduction. Thus, both have been widely used for many years. However, corresponding with an increase in the world's population and lengthening of lifespan, a remarkable increase in the need for wood and the like along with a diversification of uses has occurred, thereby increasing the demand for wood material to a new high. To this end, in addition to conventional lumber, new wood group materials of the collected wood and single plate piled wood (plywood, LVL) and the like have been developed as aforementioned.

However, despite the availability of conventional lumber, collected wood, and single plate piled wood (plywood, LVL), problems arise which prevent the effective use of limited forest resources. That is, conventional lumber and the collected wood process utilize less than one-half of a standing tree's volume. The single plate piled wood process can utilize 60–70% of the raw material wood volume, but the raw wood is limited to that which is extremely large in diameter. With today's shrinking of forest resources and a worsening of the global environment causing additional shrinkage of this resource, coupled with the widespread use of wood as a material for furniture, building and structural objects, it is no exaggeration to say that the realization of a wood manufacturing process for eliminating the waste of raw wood from big and small trees is urgently needed. The present invention provides a wood manufacturing process which solves this problem and others.

SUMMARY OF THE INVENTION

In accordance with the present invention, a method and apparatus are provided for manufacturing a wood composite from piles of split and disrupted pieces of raw wood. The wood piles are constructed such that a plurality of single layers are formed of finely split woods, in turn, formed by roughly splitting waste wood, bamboo or other raw material lengthwise. The finely split materials are adhered in horizontal and vertical directions. An adhering portion disposed between each single layer is placed at a position distanced away from an adhering portion of another layer in the pile. Each finely split piece is coupled to another by an adhesive agent which is employed under pressure.

In an illustrated embodiment, the wood pieces (e.g., bamboo or other raw material) are first roughly split and disrupted lengthwise. Next, the roughly split pieces are finely split and disrupted lengthwise. The finely split and disrupted pieces may then be dried and, thereafter, an adhesive agent may be applied to the dried finely split wood. A single layer of the finely split wood may be formed by laterally arranging the finely split wood lengthwise. Next, additional layers of the finely split wood may be placed thereon. Thereafter, the wood piles may be strengthened and tightened by heating and pressing. Each single layer may be formed by laterally arranging the finely split wood lengthwise. The layers are extended longitudinally by adhering additional finely split and disrupted pieces to each other at respective end portions of each layer. The adhered portions of these respective single layer end portions are made so as not to be respectively superposed directly on top of one another.

In forming the wood piles, the geometric shape of each layer may be parallelogrammic. Also, a glass fiber fabric may be inserted between one or more of the layers of the piles.

Also in accordance with the present invention, a manufacturing apparatus is provided which includes means for roughly splitting and disrupting wood or bamboo or other raw material lengthwise. The manufacturing apparatus also includes means for finely splitting and disrupting the roughly split wood lengthwise. To apply an adhesive agent, an applying means is provided. Means are included for forming a single layer by laterally arranging the finely split wood lengthwise and applying an adhesive agent thereto. A plurality of these single layers is then stacked. Means are also provided for tightening the piled finely split wood by heating and pressing.

In an illustrated embodiment, the splitting and disrupting means include a pair of mutually confronting rotary knives and a driving power source. The rotary knives are formed of a rotary drum having circular blades disposed in multiple stages about a whole circumference. Each blade end in one rotary knife has a structure slightly protruding between a blade end of the circular blades in another rotary knife. Each circular blade in the rotary knife includes a blade end having two blades angled at about 20 degrees. The distance between each blade end is about 10 mm, and a height from the rotary drum to the blade end is about 30 mm for roughly cutting the raw material. For producing finely cut raw material, each circular blade in the rotary knife includes a single blade angled at about 20 degrees. The distance between these blade ends is about 4 mm, and a height from the rotary drum to the blade end may be about 7.5 mm.

The present invention provides a novel method and apparatus for forming useful wood building products from trees having a small diameter. Also, branches of standing trees which have been previously left as waste, and various kinds of scrap woods and the like, may be employed to form the composite wood product of the present invention. The product produced by the present invention may be used for furniture, buildings, and various structural objects.

DETAILED DESCRIPTION OF THE INVENTION

Figure 1:
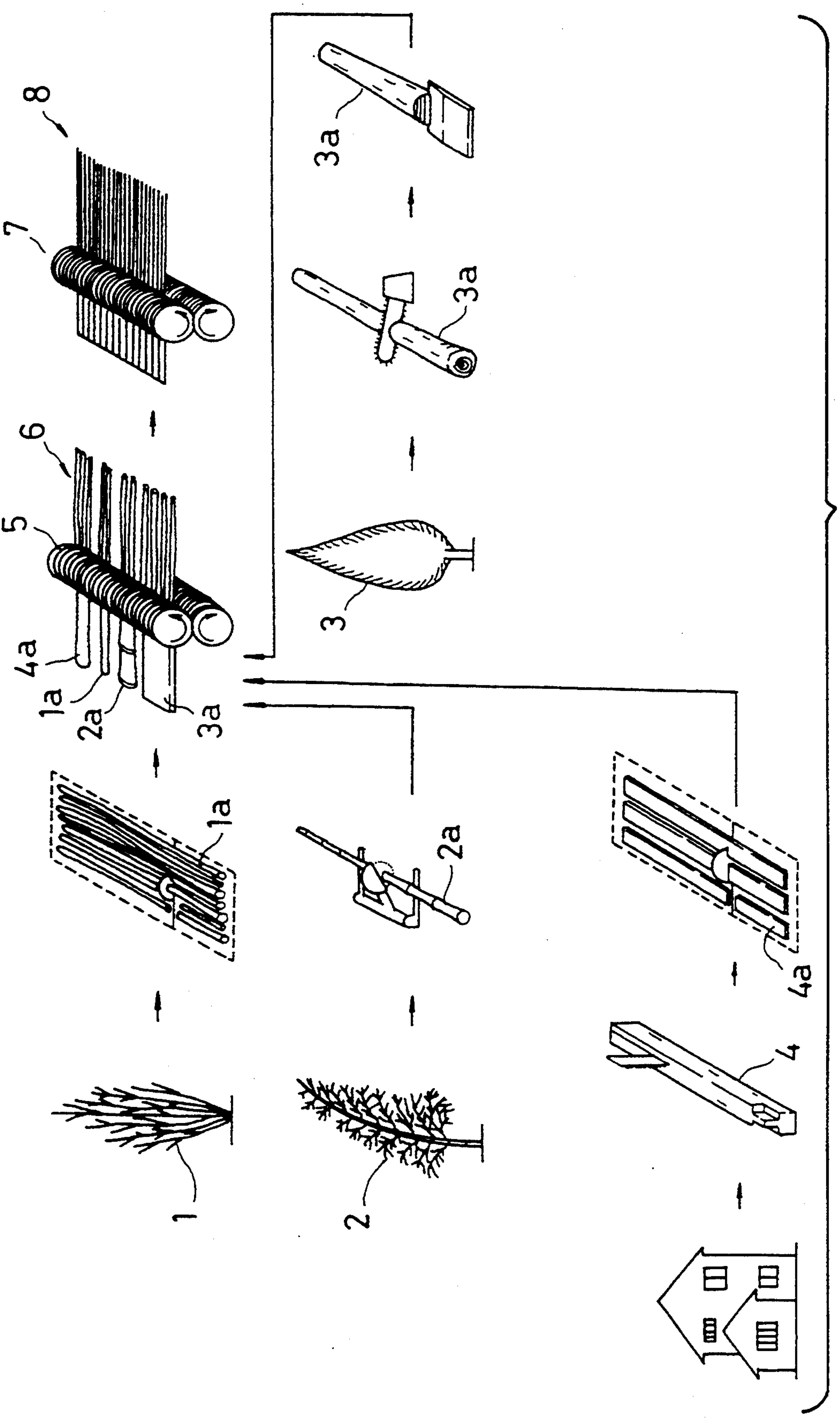
FIG. 1 is a perspective illustration of a first portion of a manufacturing process for forming wood piles of split and disrupted pieces of wood in accordance with the present invention.
Figure 2:
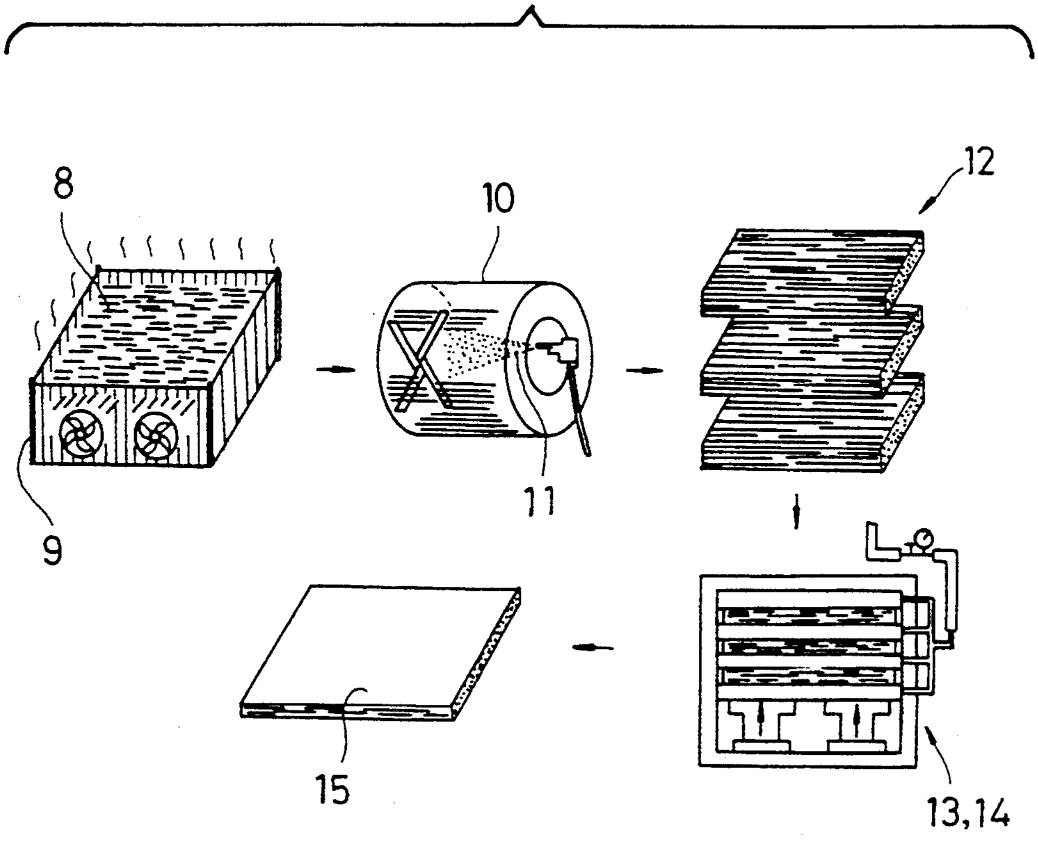
FIG. 2 is a perspective illustration of a second portion of a manufacturing process for forming wood piles of split and disrupted pieces of wood in accordance with the present invention.

A preferred embodiment of the invention will be described in detail with reference to the accompanying drawings. FIGS. 1 and 2 are diagrams showing a preferred embodiment of a process for manufacturing a composite, piled wood product using split and disrupted pieces of wood. In this embodiment, a willow, a long-jointed bamboo, a Japanese cedar, and scrap or waste wood from, e.g., a house are used as raw materials. The split and disrupted wood piles may be manufactured from the respective raw material disposed laterally as shown in FIG. 1, although it will be appreciated that it may be advantageous to mix these raw materials.

Raw materials which may be used in conjunction with the present invention include a small diameter tree 1 (about 20–50 mm in diameter) of willow, a long-jointed bamboo 2 of about 20–100 mm in diameter, a Japanese cedar 3, and waste wood 4 produced, e.g., by destruction of a house or the like. The long-jointed bamboo 1 and the willow 2 may be obtained respectively as regular sized woods 1*a*, 2*a*, e.g., by cutting to a length of approximately 600 mm with an implement such as a rotary saw. The Japanese cedar 3 and the waste wood 4 may be obtained as predetermined regular size woods 3*a*, 4*a* by, for example, cutting to a length of about 600 mm, and then further cutting to provide a wood plate of about 25 mm thickness. Successively, split and disrupted pieces 6, each on the order of 10 mm in thickness, are made by splitting and disrupting the regular sized wood from the raw materials (e.g., willow 1, bamboo 2, cedar 3, and/or wastewood 4) by a splitting and disrupting device 5 which will be more fully described hereinafter. The split and disrupted pieces 6 may further be finely split to finely split and disrupted pieces 8 of about 4 mm×10 mm in section by a finely splitting and disrupting device 7. Further, at this time, a raw material of less than approximately 600 mm in length may also be inserted into the finely splitting and disrupting device 7.

Next, as illustrated in FIG. 2, the finely split and disrupted pieces 8 are piled in a drying machine 9 at a thickness of approximately 10–20 mm, and dried at a temperature of about 180°–200° C., with a wind velocity of approximately 10 m/second for about 5–10 minutes. It will be appreciated that the drying may alternatively be a natural drying, in which case the material is dried by a wind of normal temperature for approximately 2–3 days.

The dried finely split and disrupted pieces 8 may be sprayed with a phenolic resin adhesive (weight ratio of the adhesive to the finely split and disrupted pieces is about 10%) within a rotary drum 10. A single layer of the resultant finely split and disrupted pieces 8 may be formed by laterally arranging them lengthwise within a wood frame (e.g., 650 mm×650 mm). A mat 12 of the finely split and disrupted pieces, on the order of 80 mm—120 mm in thickness, is obtained by sequentially piling the finely split and disrupted pieces 8 in single layers. Further, in piling the single layers, each are piled so that where end portions of each single layer are abutted together, each end portion of each layer is not piled directly on another end portion. A glass fiber fabric of about 0.1 mm–0.2 mm thickness can optionally be inserted between each layer to be piled, to improve the quality of the finished product. Such a product is not likely to crack when nails are hammered therethrough. The glass fiber fabric may be provided only on the abutting end portions.

The mat 12 obtained from the aforementioned process is pressed at a pressure of about 6 kgf/c for approximately 10 minutes by a cold press 13, and then pressed at a pressure of about 4–12 kgf/c and at a temperature of approximately 150° C. for about 25 minutes by a hot press. Thereafter, the pressure is released and the mat 12 is allowed to cure and form a piled wood plate 15 with split and disrupted pieces of about 25 mm–30 mm in thickness.

Figure 3:
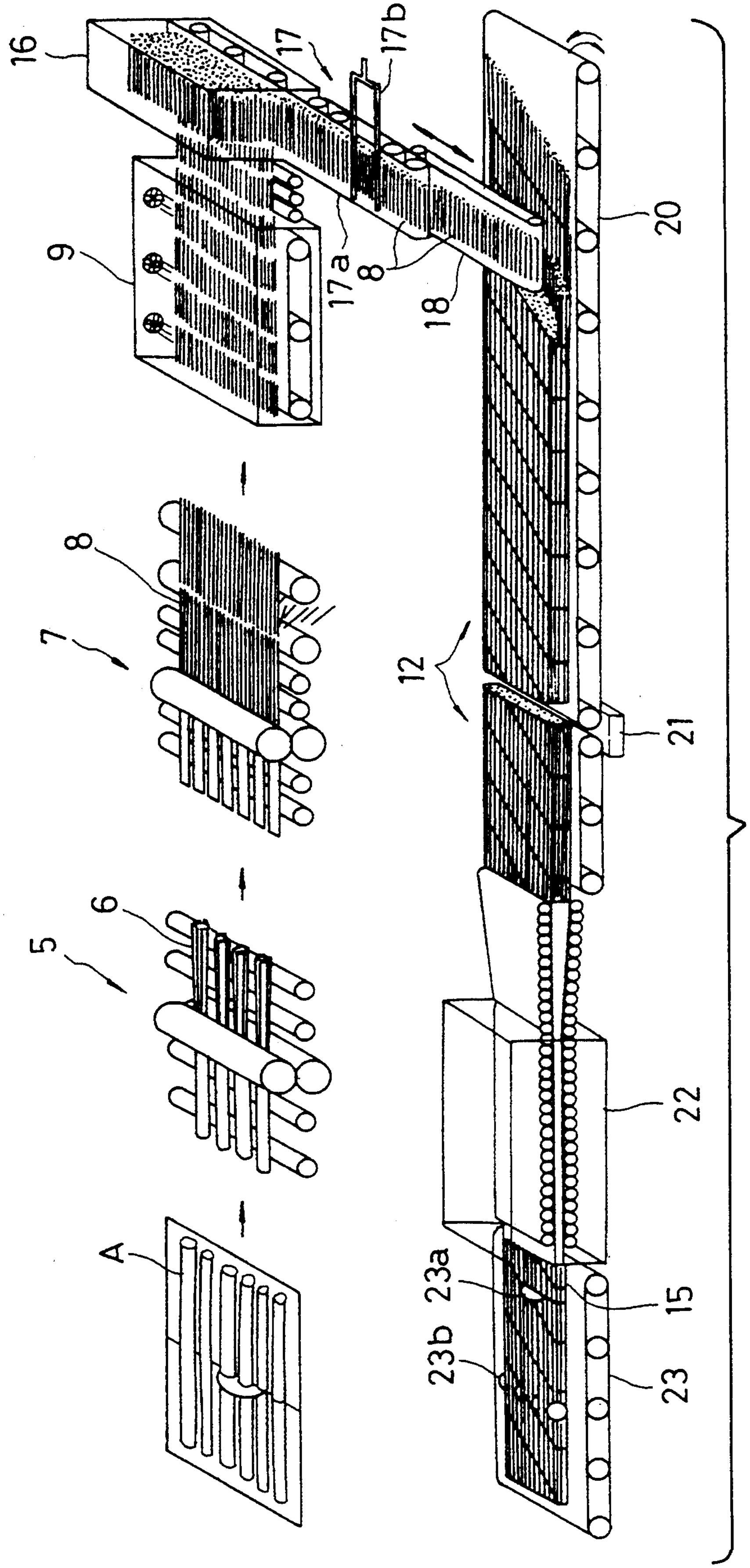
FIG. 3 is a perspective illustration of a preferred embodiment of an apparatus for manufacturing wood piles with split and disrupted pieces of wood in accordance with the present invention.

FIG. 3 is a diagram showing an embodiment of a machine for the continuous manufacturing of wood products from split and disrupted pieces in accordance with the present invention. The machine includes a splitting and disrupting device 5 for splitting and disrupting various raw materials already having been cut to a predetermined length, size, and shape. A finely splitting and disrupting device 7 is provided for forming finely split and disrupted pieces 8 by further finely splitting and disrupting roughly split and disrupted pieces 6 sent from the roughly splitting and disrupting means 5 by, e.g., a conventional conveying means which is not shown. Also included is a drying device 9 for drying the finely split and disrupted pieces 8 and a stocker 16, for receiving the finely split and disrupted pieces 8.

An adhesive applying device is provided which includes a net shaped belt conveyor **17*a* and a sprayer 17*b* for spraying an adhesive agent to both the top and bottom portions of the finely split and disrupted piece 8. A piling means is interposed between the net shaped belt conveyor 17*a* and a conveying means 20 which forms a finely split and disrupted piece mat 12 by advancing and retreating in the direction of the arrow. The piling means cooperates with a movement of the belt conveyor of the conveying means 20 to form a single layer of a desired shape and to sequentially pile the finely split and disrupted pieces 8. A cutting device 21 is provided for cutting the finely split and disrupted piece mat 12, conveyed by the conveying means 20, into a predetermined length, and includes a cross cutting saw (not shown) for cutting the finely split and disrupted mat 12**.

A pressing and tightening means 22 is employed to form the tightened wood pile 15 by heat-pressing the finely split and disrupted piece mat 12. The pressing and tightening means may include a hot press or a high frequency heating press which vulcanizes the adhesive agent. A trimming means may be included for cutting the tightened wood pile 15 sent from the pressure tightening means 22. The trimming means may include a cross cutting saw **23*a* and a sizer 23*b*** or the like for cutting the wood into a predetermined size and shape.

Figure 4:
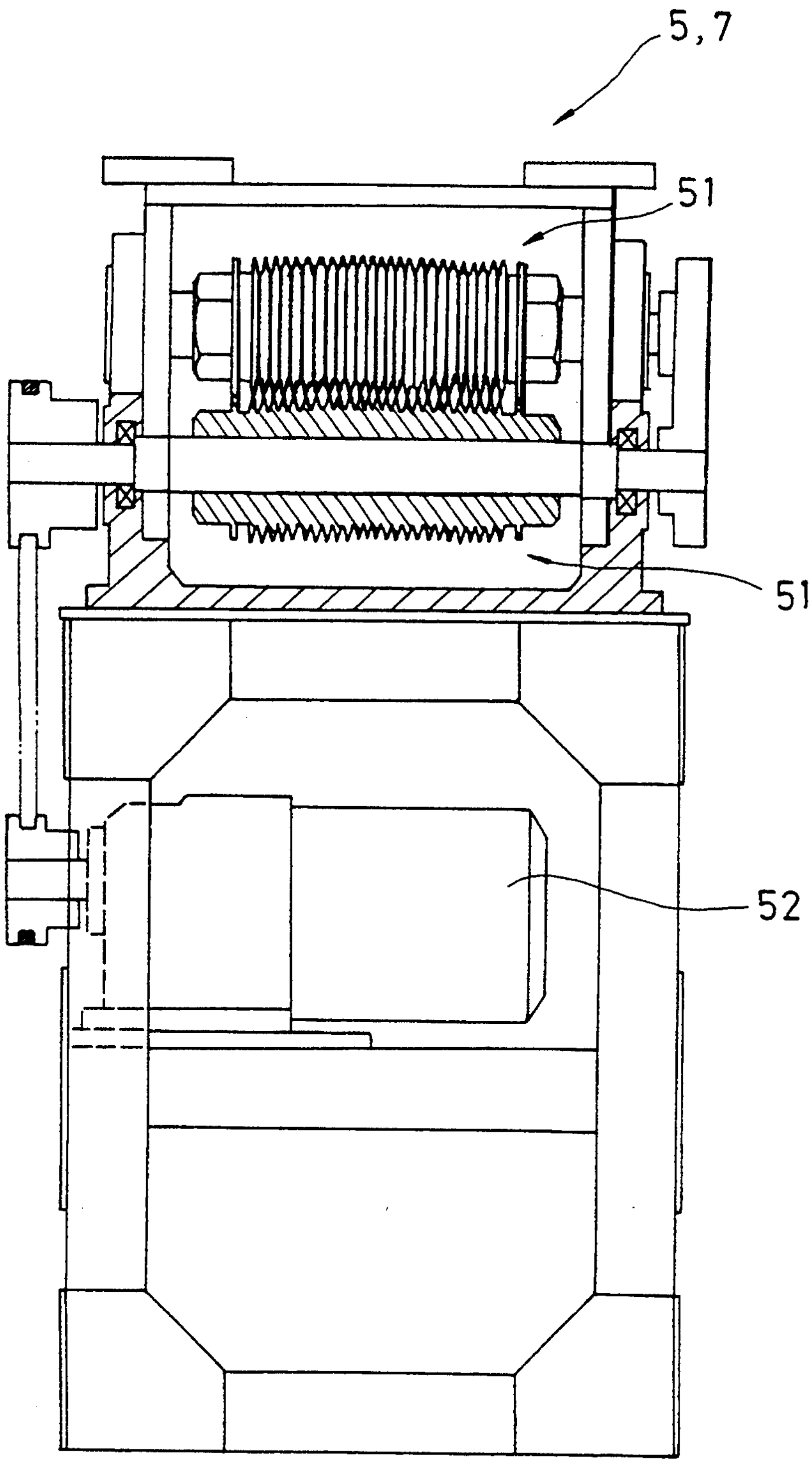
FIG. 4 is a front view of the apparatus for splitting and disrupting of FIG. 3.
Figure 5:
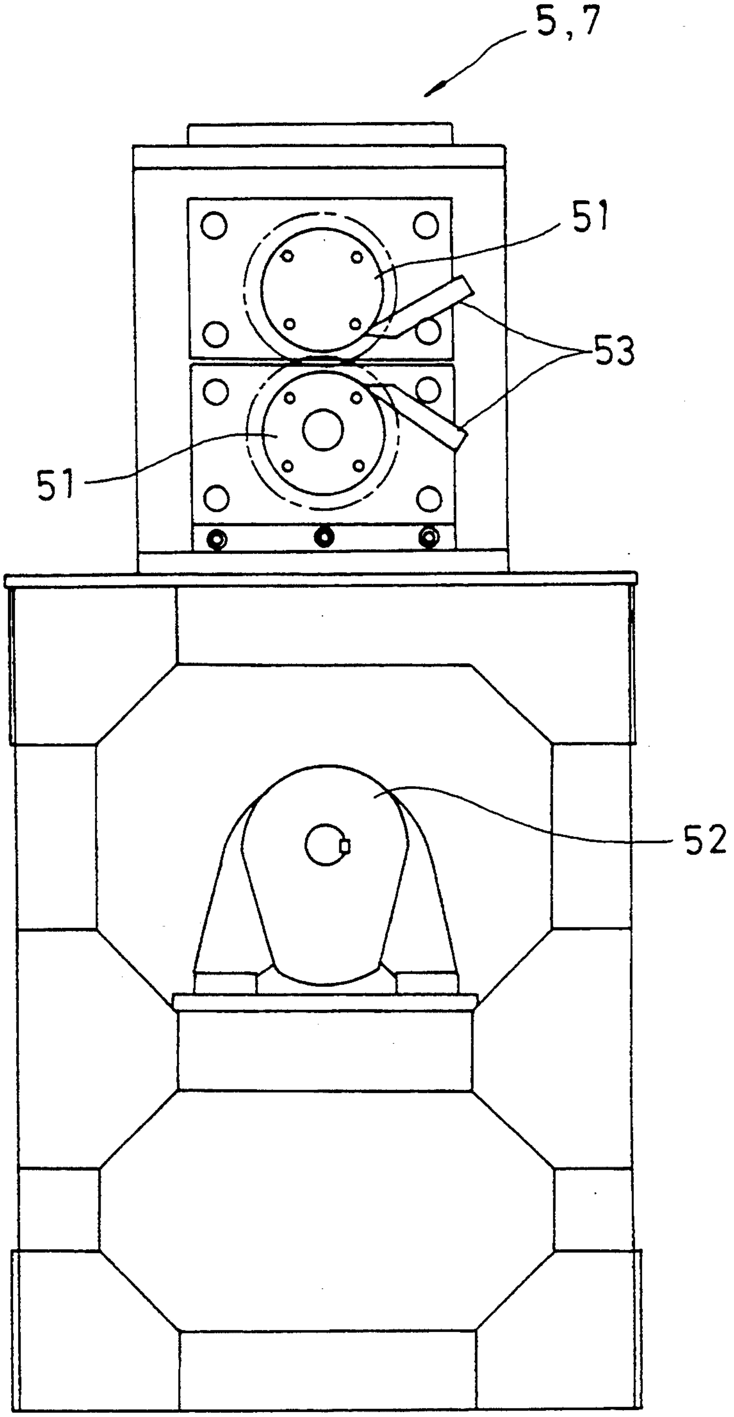
FIG. 5 is a side view of the apparatus of FIG. 4.

Referring now to FIGS. 4 and 5, the splitting and disrupting device 5 is shown in greater detail. The splitting and disrupting device 5 includes a pair of oppositely faced rotary knives 51, a motor 52 as a driving source, and a guide 53 for forwarding the raw material in the direction of the rotary knives.

Figure 6:
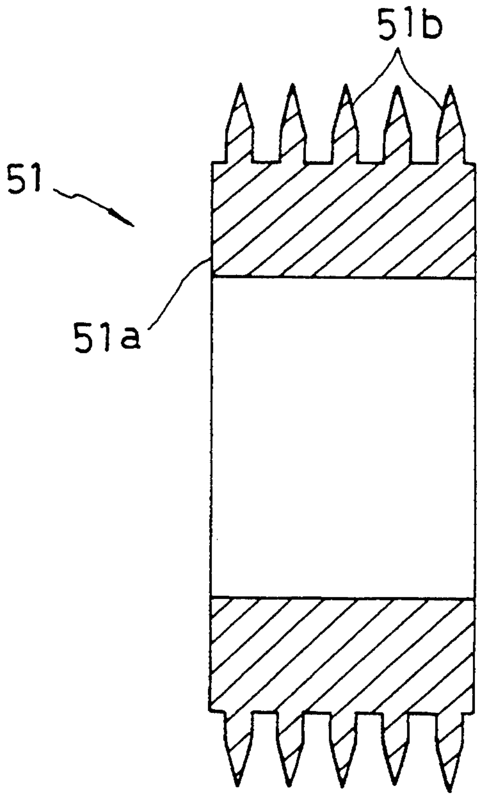
FIG. 6 is a cross sectional view showing a preferred embodiment of a rotary knife for manufacturing the split and disrupted pieces in accordance with the present invention.

As depicted in FIG. 6, the rotary knife 51 includes a rotary drum **51*a* and a circular blade 51*b* laterally arranged in multiple stages around a whole circumference thereof. The circular blades 51*b* are also arranged in predetermined distance intervals. The rotary knife 51 shown in this Figure is used for the splitting and disrupting device 5, and a blade end of the circular blade 51*b* terminates in dual or twin blade tips or ends. In this embodiment, an angle of the twin blade end is formed at 20 degrees, a height of the circular blade 51*b*, i.e., a height from the rotary drum 51*a* to the blade 51*b* is 30 mm, and a distance between each circular knife 51*b*** is 10 mm.

Figure 7:
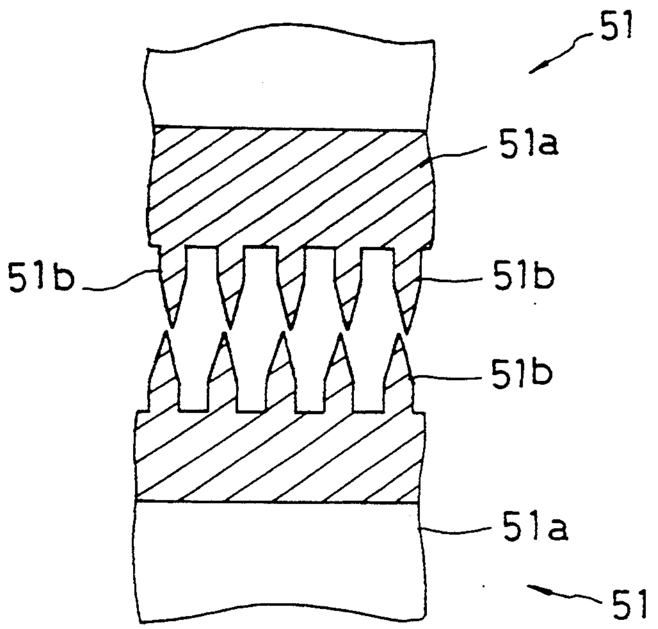
FIG. 7 is a cross sectional view showing an engaging state of the rotary knife of FIG. 6.

As illustrated in FIG. 7, a pair of rotary knives 51, 51 are made respectively to rotate in opposite directions and are arranged so as to be oppositely facing each other as previously described. The blade end of the confronting circular blade **51*b* is located slightly offset from and adjacent a gap formed by the blade end of the counterpart circular blade 51*b***.

Figure 8:
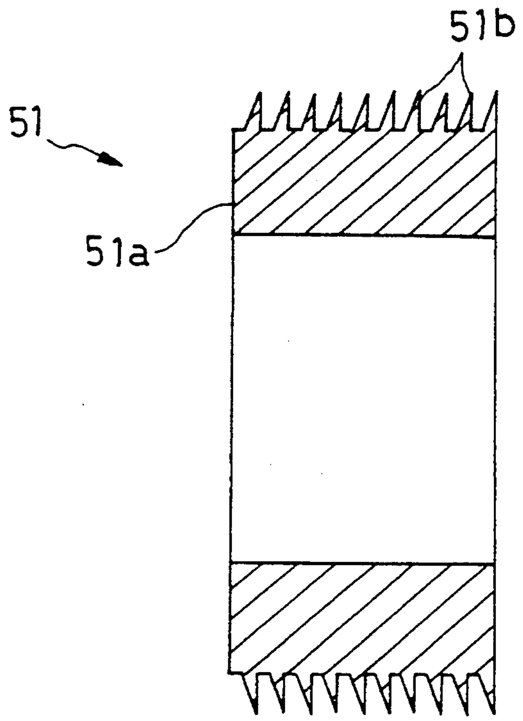
FIG. 8 is a cross sectional view showing a preferred embodiment of the rotary knife for manufacturing the finely split and disrupted pieces in accordance with the present invention.

The rotary knife 51 shown in FIG. 8 is employed in the finely splitting and disrupting device 7, and the blade end of the circular blade **51*b* is formed of a single blade shown in the drawing. An angle of the single blade end is formed at 20 degrees, a height of the circular blade 52*b*, i.e., a height from the rotary drum 51*a* to the blade end is 7.5 mm, and a distance between each circular blade is 4 mm. The rotary knives 51, 51 are rotated respectively in opposite directions and are oppositely facing each other as described above, but the blade end of the confronting circular blade 51*b*** is made such that each blade end is contacted much like a scissors so as to cut the material processed.

Figure 9:
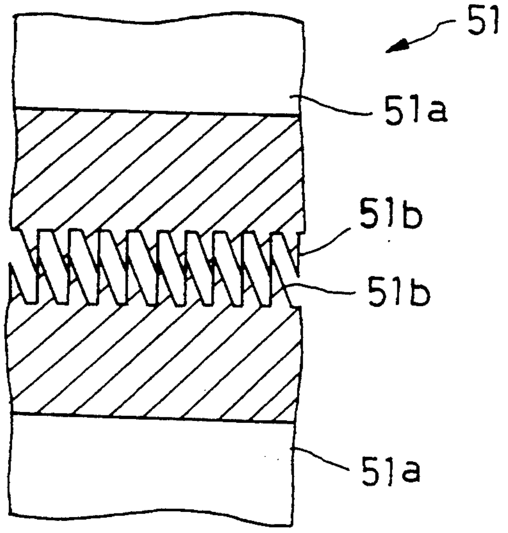
FIG. 9 is a cross sectional view showing an engaging state of the rotary knife shown in FIG. 8.

Referring again to FIG. 3, the operation of the manufacturing machine in accordance with the above-described embodiment will now be described. In this embodiment, a log of less than 50 mm in diameter may be used as a raw material. First, the log A is cut to a length of about 600 mm by using a cross cutting saw or a chain saw. The cut log A is split and disrupted by the splitting and disrupting device 5 (see FIGS. 4, 5, 6, and 7) having the aforementioned rotary knife 51 thereby forming a roughly split and disrupted piece 6 of about 10 mm in thickness. Successively, the roughly split and disrupted piece 6 is sent to the finely splitting and disrupting device 7 having the aforementioned rotary knife (refer to FIGS. 8 and 9) whereby it is further finely split and disrupted to form a finely split and disrupted piece 8 of approximately 10 mm in width and 4 mm in thickness. This finely split and disrupted piece 8 is dried by a hot flow of air in the drying device 9. The drying time period is about 10 minutes at a temperature of 200 C.

The finely split and disrupted piece 8 having finished the drying process is sent to the adhesive applying device 17 through the stocker 16 where an adhesive agent is applied. The adhesive agent is applied to the finely split and disrupted piece 8 by a sprayer **17*b* to both the top and bottom portions while being carried by the net shaped belt conveyor 17***a*. Thereafter, the finely split and disrupted piece 8 is conveyed to the piling means 18. As the finely split and disrupted piece 8 is moved out of the net shaped belt conveyor 17*a*, the piling means 18 advances in the direction of the arrows, and sequentially deposits the finely split and disrupted pieces 8 on the conveyor means 20. Through the reciprocating movement of the conveying means 20 it is possible to sequentially form single layers (i.e., sections) B1, B2 of the finely split and disrupted pieces 8 as shown in FIG. 10.

Next, the belt conveyor of the conveying means 20 reciprocates and another layer shown by C1, C2 is sequentially piled on the B layer. A further single layer D1, D2 is then placed, in turn, on the C layer, whereby a finely split and disrupted piece mat 12 is formed. As shown in FIG. 10, the end portions (adhered portions) E, E, E of each single layer are arranged in a spaced format so that one is not directly on top of another.

Figure 10:
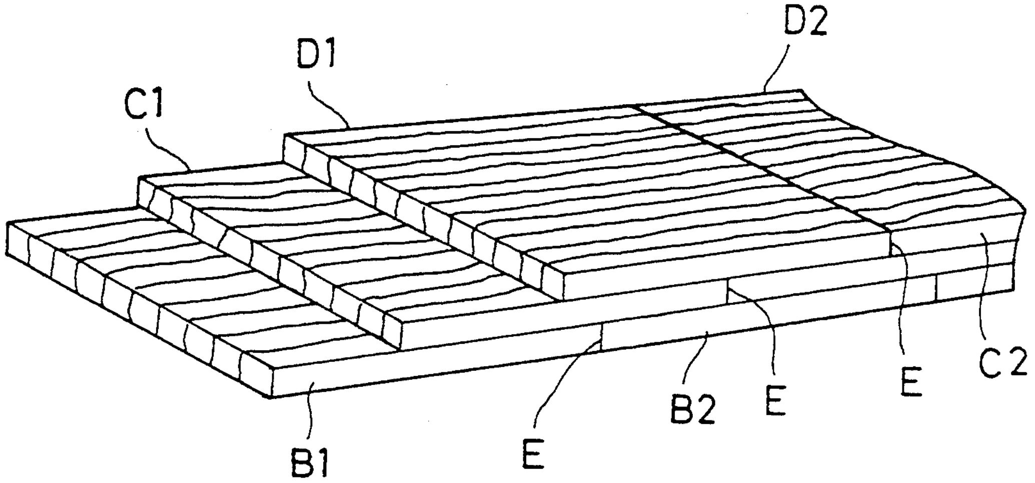
FIG. 10 is a perspective view showing a single layer formed by laterally arranging finely split and disrupted pieces.
Figure 11:
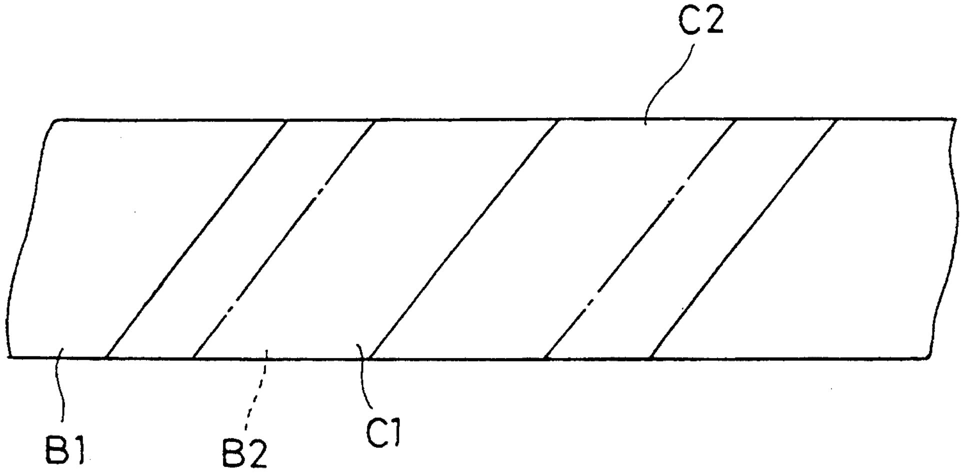
FIG. 11 is a plan view showing a single layer of the finely split and disrupted pieces formed in a parallelogrammic shape.

As illustrated in FIG. 10, the single layers are formed in a rectangular shape although it will be appreciated that any shape may be employed. For example, each single layer may be formed in a parallelogrammic shape as shown in FIG. 11. It will be appreciated that a parallelogrammic shape such as this may be formed by moving the belt conveyor during the feeding of the finely split and disrupted pieces 8 from the piling means 18 to the conveying means 20. In either situation, the forming of the single layer and the piling of the single layers are executed by a cooperative movement of the adhesive applying means 17, the piling means 18, and the conveying means 20. A control means (not shown) may also be provided to effect the cooperative movement required to form the piling of single layers.

The finely split and disrupted piece mat 12 is cut to a predetermined length by the aforementioned cutting device 21, and then forwarded to the pressure tightening means 22 where it is heated and pressure tightened and then vulcanized with an adhesive agent.

The wood piled with split and disrupted pieces as manufactured by the previously described process has a structure including at least one layer of finely split and disrupted pieces arranged laterally. The finely split and disrupted pieces are formed by splitting and disrupting the wood, bamboo or other raw materials lengthwise. The finely split and disrupted piece mat is adhered in multiple layers in horizontal and vertical directions where the adhered portion of each single layer is placed at a position distanced away from the adhered portion of another layer superposed thereon.

As illustrated in FIG. 3, the tightened wood pile 15 is conveyed from the pressure tightening means 22 to the trimming means 23, where it may be trimmed to a desired shape.

EXAMPLES

In accordance with the present invention, examples of composite wood products formed from piles of finely split and disrupted pieces were manufactured and tested for performance characteristics. In a first example, test 1, the piled wood was manufactured under the conditions described in Table 1.

TABLE I

Pressure tightening conditions

Cold press

Press pressure: 6 kgf/c,

Pressure tightening time: 10 minutes

Hot press

Press pressure: 4–12 kgf/c,

Temperature: 150 degrees Centigrade,

Time: 25 Minutes

Four samples of piled wood were manufactured with split and disrupted pieces for this example, each being 25 mm–30 mm in thickness, 30 mm in width, and 600 mm in length. The raw materials of the split and disrupted pieces included Japanese cedar log, cedar waste wood, willow, and long-jointed bamboo.

Figure 12:
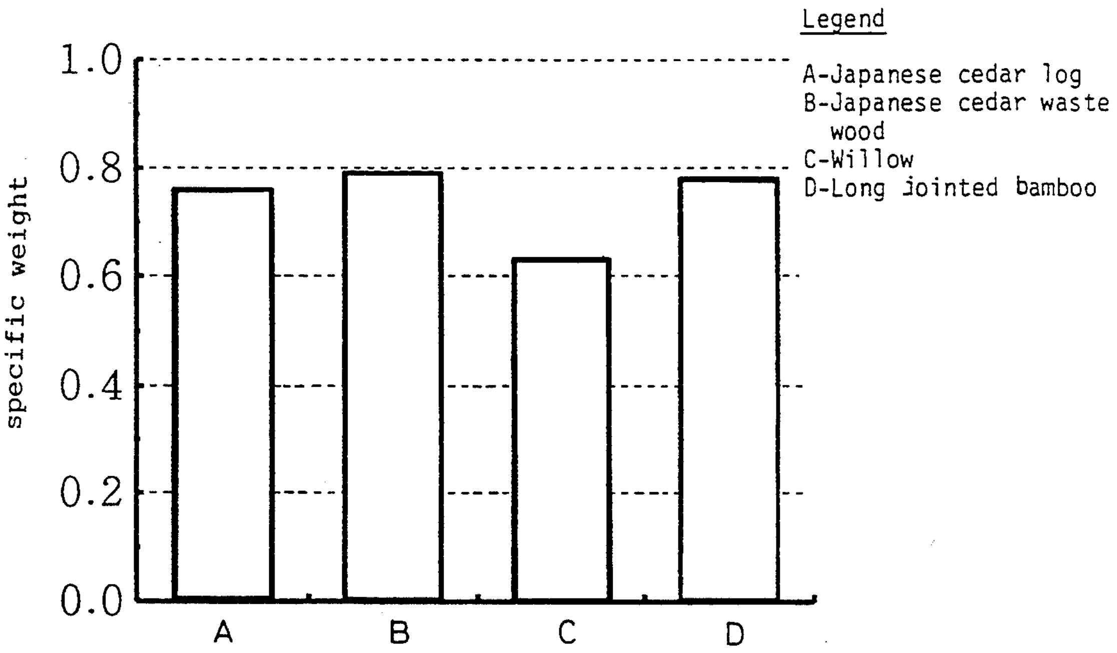
FIG. 12 is a graph comparing a specific weight of products manufactured in accordance with the invention by material of respectively different kinds.

FIG. 12 is a graph showing the specific weight obtained for each of the four examples. A review of FIG. 12 shows that considerable differences arise in specific weight according to the raw material utilized. The Japanese cedar and the willow have become approximately 1.5 times the specific weight of a conventional lumber product, while the long-jointed bamboo remained approximately equal to the specific weight of the original long-jointed bamboo.

Figure 13:
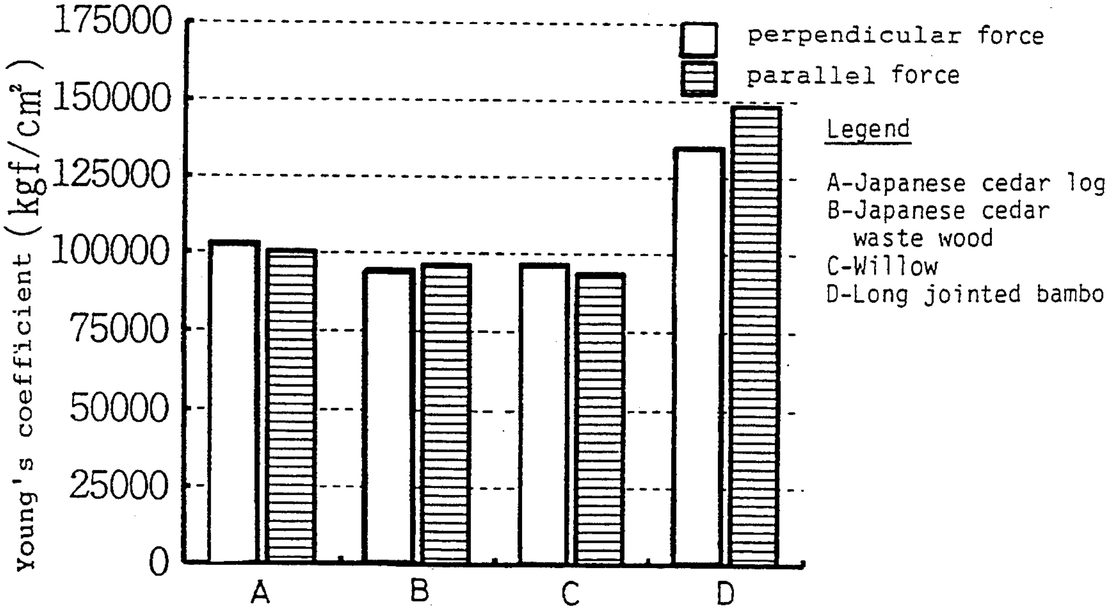
FIG. 13 is a graph comparing Young's coefficient of bending for the products compared in FIG. 12.

FIG. 13 is a graph showing the results obtained for Young's bending coefficient. As can be seen, the Young's bending coefficients for the wood composite of the present invention using either Japanese cedar or willow are approximately the same. The differences between a perpendicular force (in the case of loading applied perpendicularly to the pressure tightening direction) and a parallel force (in the case of loading applied parallel to the pressure tightening direction) are minor. The bending coefficient value is approximately 1.5 times the value of the Young's bending coefficient achieved using a conventional lumber product. The long-jointed bamboo also reflects little difference between bending coefficients due to a perpendicular force and a parallel force, but results in coefficients similar to conventional long-jointed bamboo products.

Figure 14:
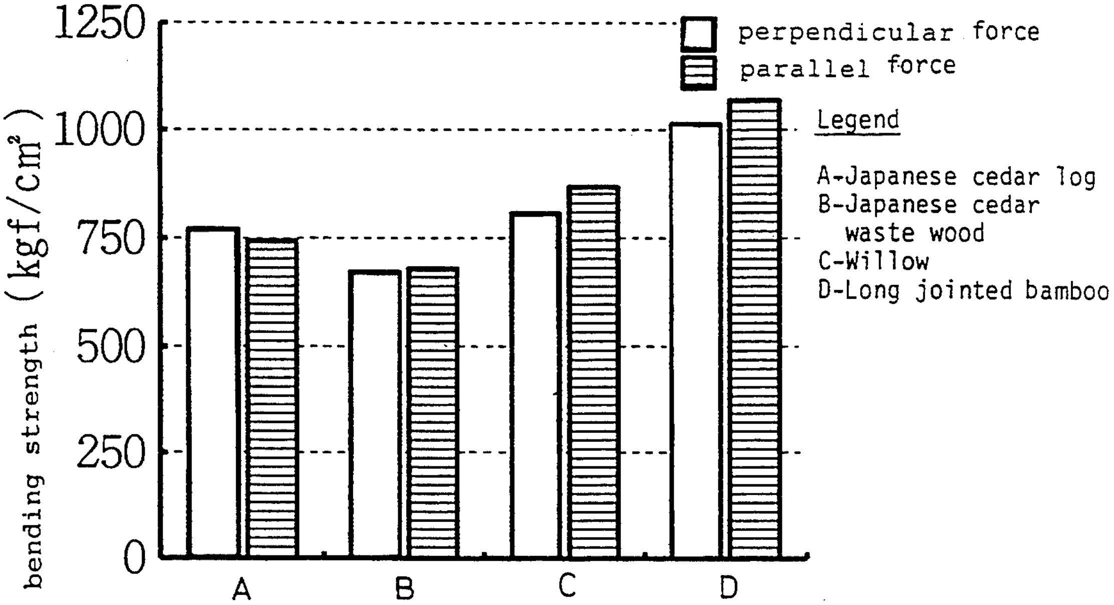
FIG. 14 is a graph comparing a bending strength of the products compared in FIG. 12.

FIG. 14 is a graph showing the results of a bending strength test. None of the tested raw materials produced any significant differences in bending strength for a perpendicular force or a parallel force. The bending strength of the wood composite of the present invention using either Japanese cedar or willow is approximately three times that of a conventional lumber product using Japanese cedar or willow.

Figure 15:
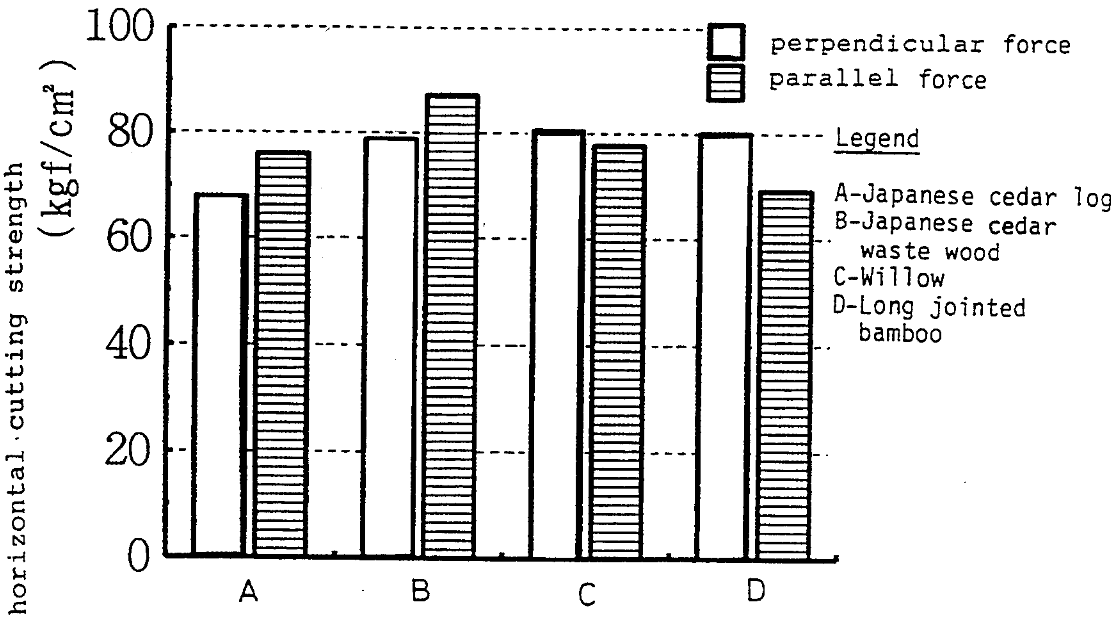
FIG. 15 is a graph comparing a horizontal cutting strength of the products compared in FIG. 12.

FIG. 15 is a graph showing the results of a horizontal cutting strength test. The strength of the wood piled with split and disrupted pieces of Japanese cedar or willow in accordance with the present invention is very similar to the strength of conventional Japanese cedar and willow lumber.

The results for test 1 indicate that the composite wood product using split and disrupted pieces of Japanese cedar or willow has an increased specific weight relative to the raw material. Since a defective portion of the raw material, such as gnarls, etc. is dispersed, the values of Young's bending coefficient and bending strength become remarkably higher for the examples manufactured in accordance with the invention relative to the raw material. Therefore, the present invention provides a new material which is very suitable, for example, for structural members of buildings and the like requiring high quality performance. Moreover, in the example of long-jointed bamboo, even though the specific weight and the performance of the long-jointed bamboo are inherently high, when the press pressure is raised to approximately 10–20 kgf/c, it is expected that an even higher performance can be realized by fabricating split and disrupted pieces of long jointed bamboo in accordance with the present invention.

Another example was manufactured in accordance with the present invention under the conditions described in Table 2. FIGS. 16 to 19 illustrate the test results for the specific weight, Young's coefficient of bending, the bending strength, and the horizontal cutting strength of the resultant composite wood product.

TABLE 2

Pressure tightening conditions
Cold press
Press pressure: 6 kgf/c
Pressure tightening time: 10 minutes
Hot press
Press pressure: 4–12 kgf/c
Temperature: 150 C.
Time: 25 minutes In this second example, the wood pile was formed of split and disrupted pieces of 25 mm–50 mm in thickness, 30 mm in width, and 600 mm in length. The raw material used for the split and disrupted pieces were small diameter willow trees of 20 mm–60 mm in diameter. Several samples were manufactured and subjected to different hot press pressures including 4 kg, 6 kg, 8 kg, and 12 kg for comparison.

Figure 16:
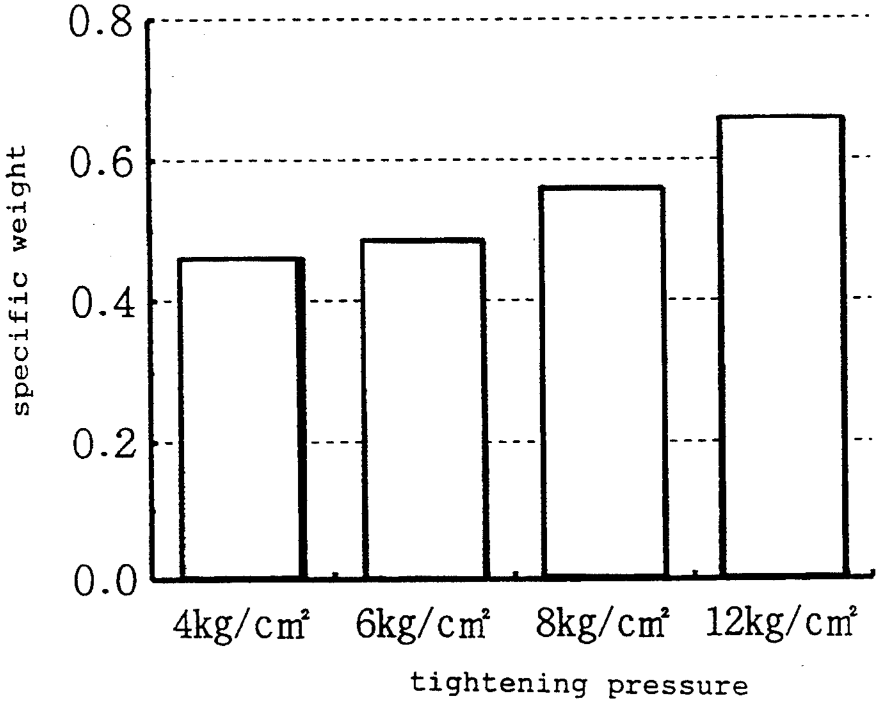
FIG. 16 is a graph comparing a specific weight of one raw material where, during manufacturing, the tightening pressure is varied.

FIG. 16 is a graph showing results of measuring the specific weight. From these results, it is apparent that as the press pressure is increased from 4 kgf/c to 12 kgf/c, the specific weight also increases.

Figure 17:
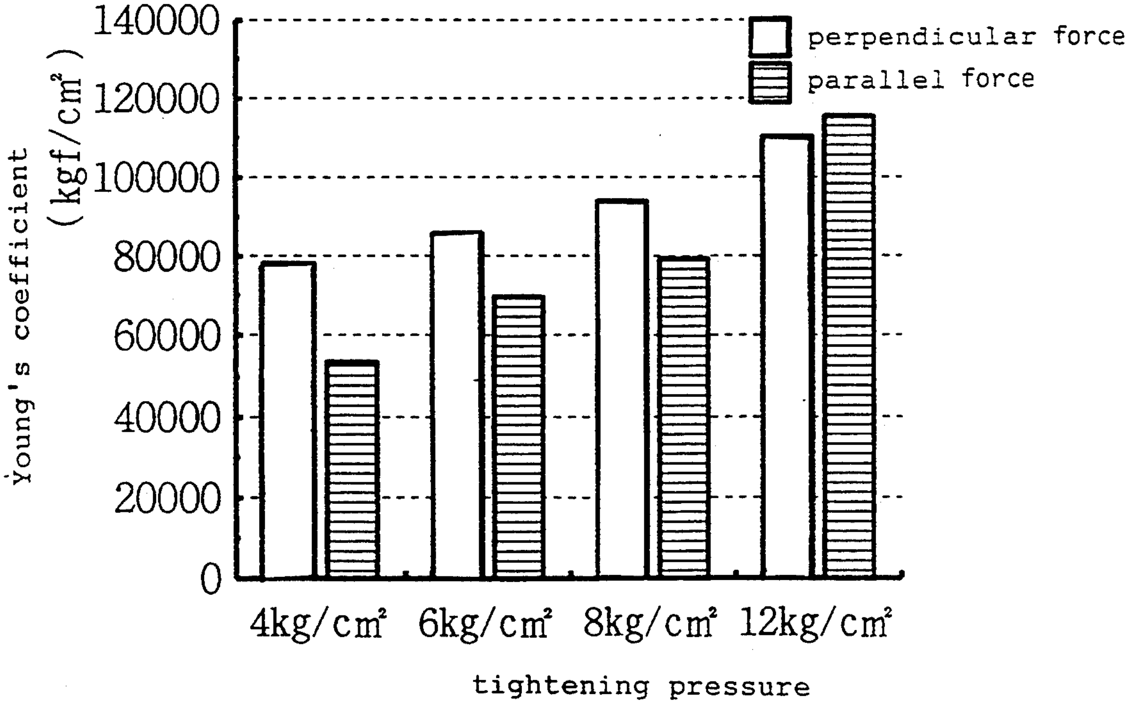
FIG. 17 is a graph comparing Young's coefficient of bending for the products compared in FIG. 16.

FIG. 17 is a graph depicting the measured Young's bending coefficient. As to Young's bending coefficient for each sample of wood, the perpendicular force (in the case of loading applied perpendicularly to the pressure tightening direction) is higher than the parallel force (in the case of loading applied parallel to the pressure tightening direction) for all but the highest tightening pressure (12 kg/cm$^2$). The Young's bending coefficient is increased in all cases in response to an increase in tightening pressure.

Figure 18:
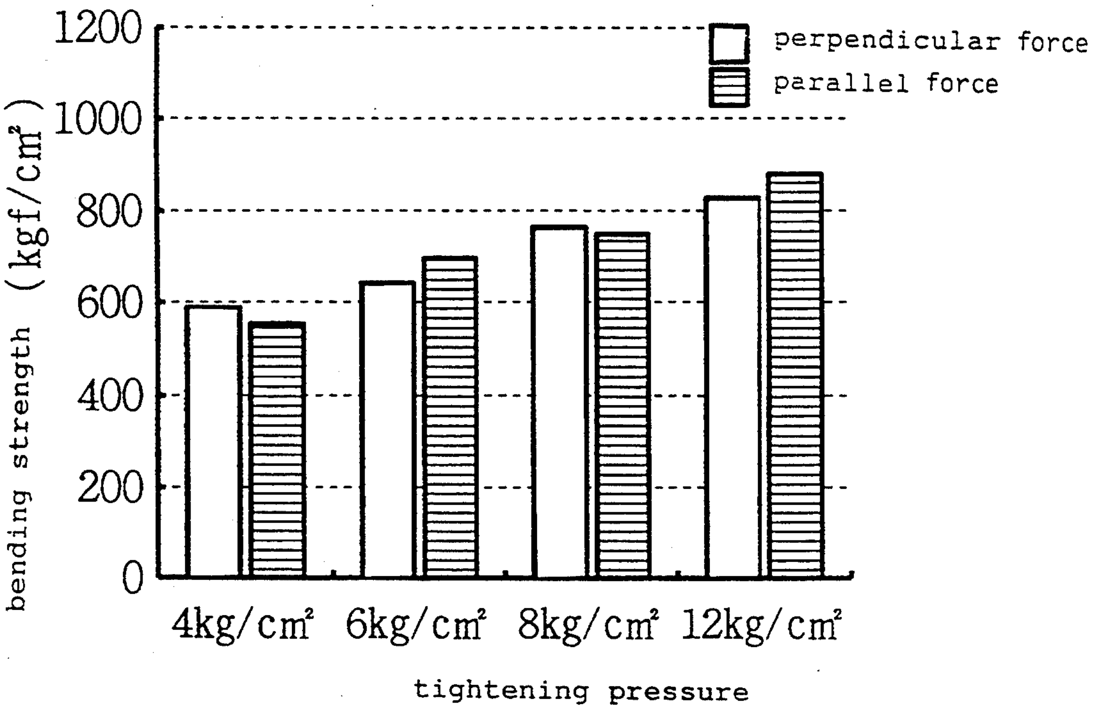
FIG. 18 is a graph comparing a bending strength of the products compared in FIG. 16.

FIG. 18 is a graph showing the results of measuring the bending strength of the samples. Strength increases in response to an increase in pressure, but the perpendicular force and the parallel force produce no significant difference in bending strength.

Figure 19:
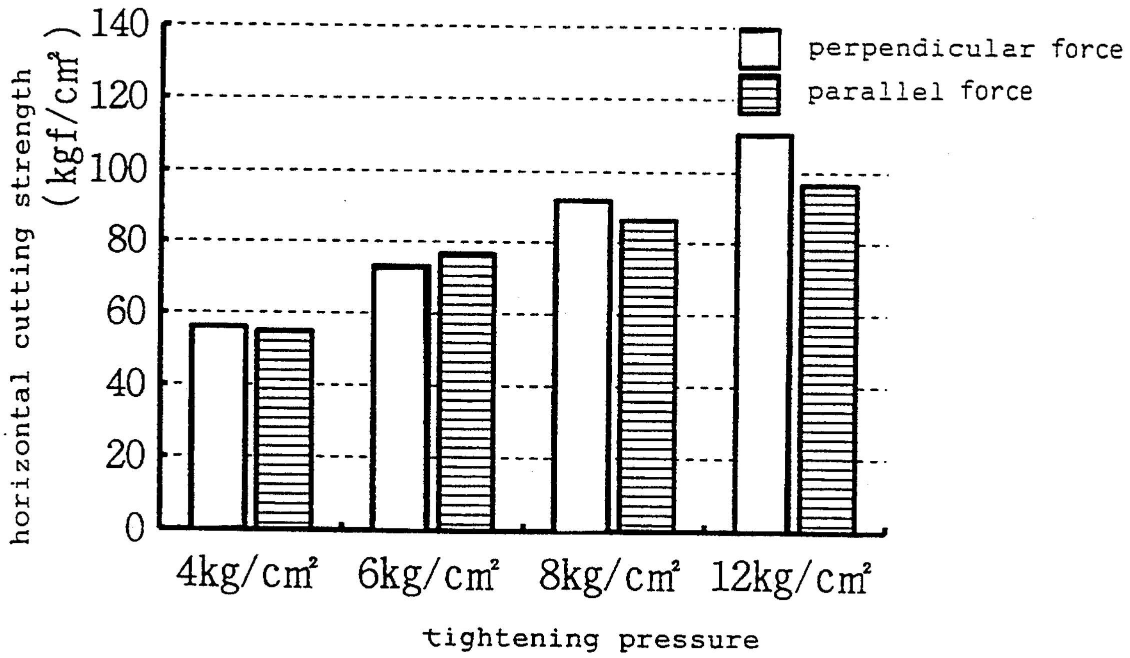
FIG. 19 is a graph comparing a horizontal cutting strength of the products compared in FIG. 16.

FIG. 19 is a graph showing results of the horizontal cutting strength test. The strength is increased in response to the increase in tightening pressure, and a larger difference of strength between the perpendicular force and the parallel force is also produced as tightening pressure increases.

From the test results of the second example, it is apparent that the strength of the product can be freely controlled by changing the tightening pressure during manufacture of the piled wood in accordance with the present invention. For instance, comparing the strength of the wood samples in the second example and conventional willow lumber of the same size and shape, the wood piled with split and disrupted pieces manufactured under a pressure of 4 kgf/c has a strength of 1.5 times, 6 kgf/c approximately 2 times, 8 kgf/c approximately 2.25 times, and 12 kgf/c approximately 2.5 times that of the lumber product.

Figure 20:
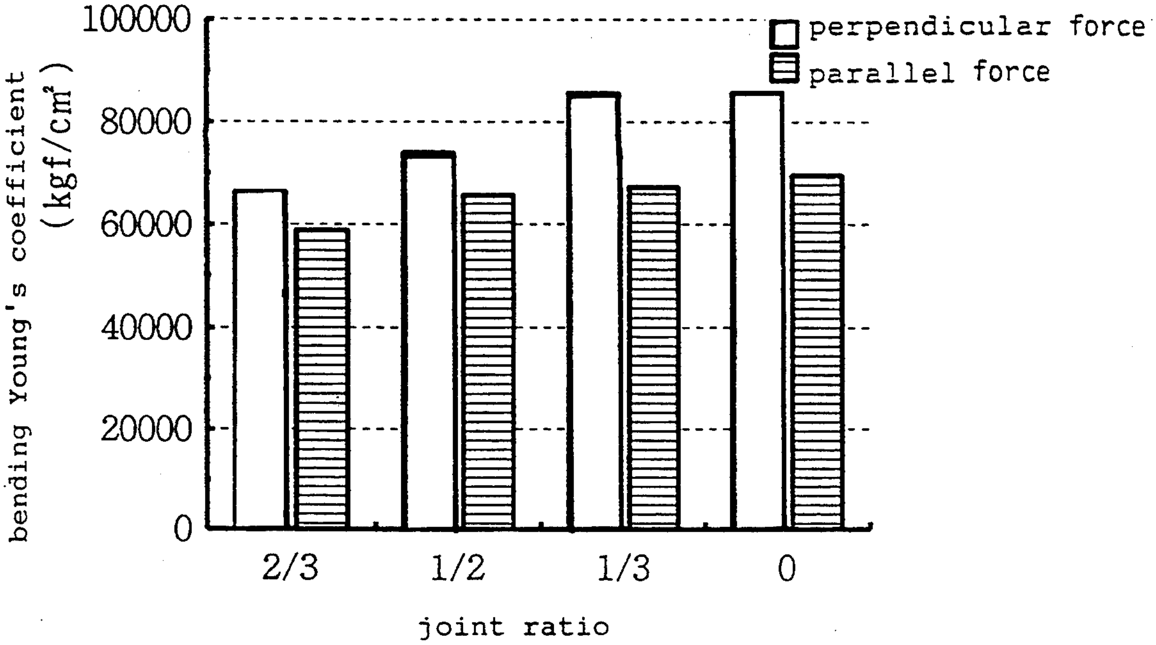
FIG. 20 is a graph illustrating that Young's coefficient of bending differs according to the location of the adhered portion of the end portions of the finely split and disrupted wood.
Figure 21:
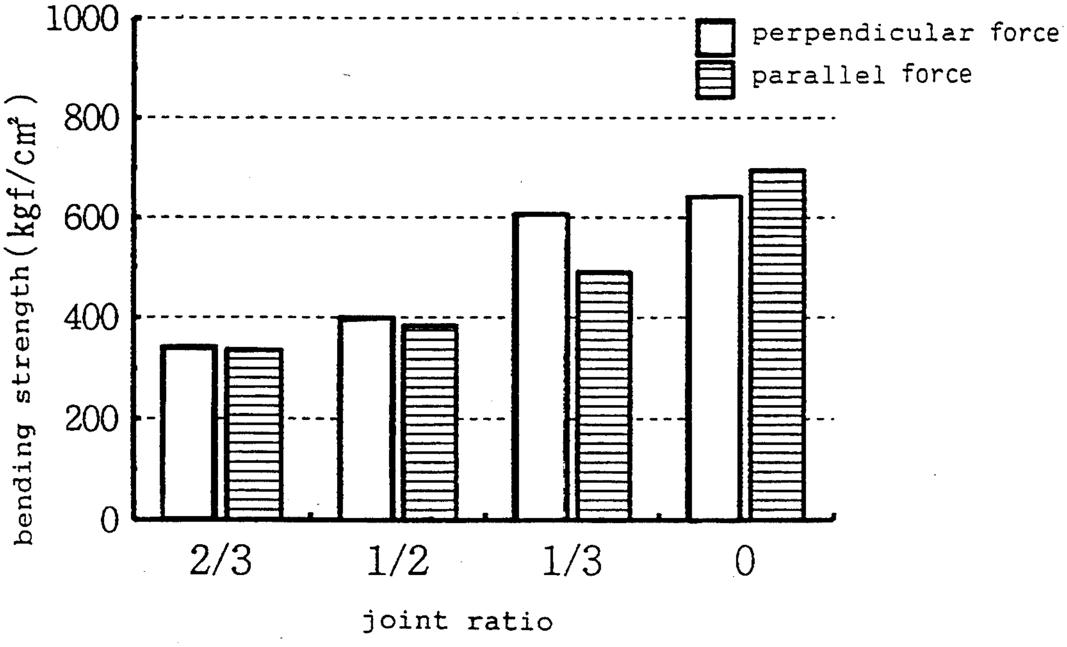
FIG. 21 is a graph showing that bending strength differs according to the location of the adhered portion of the end portions of the finely split and disrupted wood.

In the present invention, the wood piled with split and disrupted pieces includes an adhered portion located between the end portions of each split and disrupted piece. It will be appreciated that the strength of the product is naturally better where adhered portions are dispersed throughout the tightened mat 15. FIGS. 20 and 21 are graphs showing test results for a third example, comparing the strength in cases of 0, $\frac{1}{3}$, $\frac{1}{2}$, and $\frac{2}{3}$ respectively, in ratios of the adhered portion to a non-adhered portion. As shown in FIG. 20, a decreasing of Young's bending coefficient is not seen in a comparison between 0 and $\frac{1}{3}$, but there is a decrease of approximately 10% at $\frac{1}{2}$, and 20% at $\frac{2}{3}$. As is clear from FIG. 21, an increase in the number of adhered portions is more readily apparent in the bending strength. In particular, the bending strength is decreased approximately 10–20% at $\frac{1}{3}$, 30% at $\frac{1}{2}$, and 40–50% at $\frac{2}{3}$, as compared with the case where the ratio of the adhered portion to the non-adhered portion is 0.

The third example indicates that the separation of the different adhered end portions in the wood product of the present invention has a very important effect. To this end, the location of the adhered portions between split and disrupted pieces is laterally arranged with the split and disrupted pieces as described above. The adhered lengthwise portions in a single layer are not superposed in the piling direction, and the piled layer is offset as shown in FIGS. 10 and 11 whereby the ratio of said adhered portions to non-adhered portions can be suppressed to approximately 1/6. Thus, the decrease in strength due to the adhered portions is made relatively insignificant.

Yet another example is provided which involves preventing the cracking of an end portion by a nail or the like after applying a glass fiber fabric to the wood piled with split and disrupted pieces in accordance with the present invention. When a nail of 75 mm in length and 3 mm in diameter was struck into a wood pile including glass fiber and manufactured in accordance with the present invention, a crack was not produced. No crack was produced even when a nail was struck at a position of 6 mm from an end edge of the piled wood product. Accordingly, a wood product manufactured in accordance with the present invention may be joined to another via means such as a nail.

Moreover, in the above described embodiment, in accordance with the example which involved the use of a hot press (e.g., example 2) as a heating means it has been determined that a performance of the wood piles with split and disrupted pieces was not changed even if a high frequency heating method was used instead of the hot press. Such a high frequency heating method is particularly effective for manufacturing thick wood products in accordance with the invention.

The yield of a tree was determined for manufacturing composite wood products formed from piles of split and disrupted pieces in accordance with the present invention. It was determined that when a weight of the standing tree was 1000 (e.g., 1000 lbs.), a weight of the composite product obtained was 460 (e.g., 460 lbs.). However, since 490 about (e.g., 490 lbs.) is moisture or tree bark or the like out of the total 1000 of the standing tree, a substantial yield of the usable portion of the standing tree (on the order of 90%) is achieved using the present invention, and this value is improved by 2–3% when the size of the piled wood sample becomes larger.

Thus, the yield of composite wood products in accordance with the present invention is extremely high, and an effective utilization of wood resources can be expected. For instance, the yield of conventional lumber, collected wood, and plywood are respectively 50–60%, 30–40%, and 60–70%, as compared to about 90% for the product of the present invention.

As described above, in accordance with the present invention, small diameter and low quality trees, waste cut branches, piece woods produced in the lumbering process, and waste wood scraps from building, etc. can all be used without waste to produce a quality wood product. The present invention provides a very high yield and thus an improved utilization rate of forest resources. And, the weight, softness and hardness, and strength of the wood composite produced by the present invention may be formed to one's own desire by selecting various raw materials of the roughly split wood to form a wood product having a performance which cannot be obtained in a conventional wood material. Further, since low quality wood grows quickly and can be utilized in a small diameter state, the present invention provides an incentive for additional forest cultivation.

What is claimed is:

1. A manufactured wood product comprising:

a pile of single layers impregnated with a phenolic resin adhesive, each single layer comprising a plurality of sequential sections at a single level in the pile, each sequential section formed from a plurality of wood pieces that are split and disrupted in a lengthwise direction and adhered together in horizontal and vertical directions;

wherein abutting ends of sequential sections in each single level in the pile do not overlap abutting ends of sequential sections in any adjacent single level in the pile and an adhesive portion is disposed between each of said single layer thereby forming a substantially flat, substantially even surfaced and substantially voidless wood product.

2. A product in accordance with claim 1 further comprising a glass fiber fabric between adjacent single layers in said pile.

3. A product in accordance with claim 1 wherein said wood pieces comprise at least one material selected from the group consisting of cedar, willow and bamboo.

4. A product in accordance with claim 1 wherein said adjacent ends of sequential sections in a single level in the pile are adhered together.

5. A product in accordance with claim 1 wherein said plurality of split and disrupted wood pieces are laterally arranged lengthwise in at least one of said sequential sections.

6. A product in accordance with claim 1 wherein the ends of sequential sections in a single layer abut without overlapping each other.

7. A product in accordance with claim 1 wherein said split and disrupted pieces of wood have a width in the range of from about 10 mm to about 30 mm.

8. A product in accordance with claim 1 wherein said split and disrupted pieces of wood have a thickness in the range of from about 4 mm to about 50 mm.

* * * * *